United States Patent
Roessl et al.

(10) Patent No.: US 9,165,384 B2
(45) Date of Patent: Oct. 20, 2015

(54) DUAL-ENERGY TOMOGRAPHIC IMAGING SYSTEM

(75) Inventors: Ewald Roessl, Ellerau (DE); Thomas Koehler, Norderstedt (DE); Axel Thran, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 112 days.

(21) Appl. No.: 13/978,591

(22) PCT Filed: Dec. 29, 2011

(86) PCT No.: PCT/IB2011/056004
§ 371 (c)(1),
(2), (4) Date: Jul. 8, 2013

(87) PCT Pub. No.: WO2012/095713
PCT Pub. Date: Jul. 19, 2012

(65) Prior Publication Data
US 2013/0287279 A1    Oct. 31, 2013

(30) Foreign Application Priority Data
Jan. 10, 2011   (EP) ..................................... 11150468

(51) Int. Cl.
*G06K 9/00*   (2006.01)
*G06T 11/00*  (2006.01)
(52) U.S. Cl.
CPC ............. *G06T 11/003* (2013.01); *G06T 11/006* (2013.01); *G06T 2211/408* (2013.01); *G06T 2211/424* (2013.01)
(58) Field of Classification Search
None
See application file for complete search history.

(56) References Cited

U.S. PATENT DOCUMENTS

| | | | |
|---|---|---|---|
| 6,507,633 B1 | 1/2003 | Elbakri et al. | |
| 6,754,298 B2 | 6/2004 | Fessler | |
| 7,558,362 B2* | 7/2009 | Shechter et al. | 378/4 |
| 7,760,848 B2 | 7/2010 | DeMan et al. | |

(Continued)

FOREIGN PATENT DOCUMENTS

WO   03071483 A2   8/2003

OTHER PUBLICATIONS

La Riviere et al. "Penalized-Likelihood sinogram restoration for computed tomography", IEEE, Aug. 2006, vol. 25, No. 8, pp. 1022-1036.*

(Continued)

*Primary Examiner* — Vu Le
*Assistant Examiner* — Samah Beg (57) ABSTRACT

The invention relates to an imaging system (30) for imaging an object. A projection data providing unit (31) provides acquired spectral projection data of an object comprising at least two components, and a reconstruction unit (10) iteratively reconstructs at least two final component images of the object by performing several iteration steps, in which at least two intermediate component images are updated based on the acquired spectral projection data and a penalty term, which is indicative of the correlated noise between the at least two intermediate component images. Since the at least two intermediate component images are updated based on the acquired spectral projection data and a penalty term, which is indicative of the correlated noise, correlated noise is penalized during the iterative reconstruction. The finally resulting component images of the object are therefore less corrupted by correlated noise and have an improved image quality.

18 Claims, 2 Drawing Sheets

(56) References Cited

U.S. PATENT DOCUMENTS

| | | | |
|---|---|---|---|
| 7,983,462 B2* | 7/2011 | Sauer et al. | 382/131 |
| 2002/0186871 A1* | 12/2002 | Grass et al. | 382/131 |
| 2003/0156684 A1* | 8/2003 | Fessler | 378/210 |
| 2006/0087703 A1 | 4/2006 | Chen et al. | |
| 2007/0206880 A1 | 9/2007 | Chen et al. | |
| 2007/0217666 A1* | 9/2007 | Gal et al. | 382/131 |
| 2009/0116722 A1* | 5/2009 | Chen et al. | 382/132 |
| 2009/0232375 A1* | 9/2009 | Ye et al. | 382/131 |
| 2011/0085719 A1* | 4/2011 | Fan et al. | 382/131 |
| 2011/0158497 A1* | 6/2011 | Schweizer et al. | 382/131 |
| 2011/0158498 A1* | 6/2011 | Li et al. | 382/132 |
| 2011/0280458 A1* | 11/2011 | Flohr et al. | 382/131 |
| 2012/0134561 A1* | 5/2012 | Xu et al. | 382/131 |
| 2012/0177274 A1* | 7/2012 | Koehler et al. | 382/131 |
| 2012/0314922 A1* | 12/2012 | Hsieh et al. | 382/131 |
| 2013/0010917 A1* | 1/2013 | Thibault et al. | 378/4 |
| 2013/0089252 A1* | 4/2013 | Shechter | G06T 5/002 382/131 |
| 2013/0243297 A1* | 9/2013 | Koehler et al. | 382/131 |
| 2013/0279785 A1* | 10/2013 | Proksa | G06T 11/006 382/131 |
| 2013/0343624 A1* | 12/2013 | Thibault et al. | 382/131 |
| 2014/0112565 A1* | 4/2014 | Roessl et al. | 382/131 |
| 2014/0153809 A1* | 6/2014 | Koehler | 382/131 |
| 2014/0185898 A1* | 7/2014 | Park | G06T 11/005 382/131 |
| 2014/0270440 A1* | 9/2014 | Inglese et al. | 382/131 |
| 2014/0270454 A1* | 9/2014 | Chen | G06T 5/002 382/132 |
| 2014/0314331 A1* | 10/2014 | Zabic | G06T 5/002 382/254 |
| 2014/0363067 A1* | 12/2014 | Stayman et al. | 382/131 |

OTHER PUBLICATIONS

J. Wang et al. "Penalized Weighted Least-Squares Approach to Sinogram Noise Reduction and Image Reconstruction for Low-Dose X-Ray Computed Tomography," IEEE 2006, vol. 25, No. 10, pp. 1272-1283.*

Alvarez, R. E., et al.; Energy-selective Reconstructions in X-ray Computerized Tomography; 1976; Phys. Med. Biol.; 21(5)733-744.

Elbakri, I. A., et al.; Statistical Image Reconstruction for Polyenergetic X-Ray Computed Tomography; 2002; IEEE Trans. on Medical Imaging; 21(2)89-99.

Jang, K. E., et al.; Regularized Polychromatic Reconstruction for Transmission Tomography; 2011; IEEE Intl. Cont. on Image Processing; pp. 1369-1372.

Llopart, X., et al.; First test measurements of a 64k pixel readout chip working in single photon counting mode; 2003; Nuclear Instruments and Methods in Physics Research; A509;157-163.

Llopart, X., et al.; Medipix2: a 64-k Pixel Readout Chip with 55-um Square Elements Working in Single Photon Counting Mode; 2002; IEEE Trans on Nuclear Science; 49(5)2279-2283.

Noh, J., et al.; Statistical Sinogram Restoration in Dual-Energy CT for PET Attenuation Correction; 2009; IEEE Trans. on Medical Imaging; 28(11)1688-1702.

O'Sullivan, J. A., et al.; Alternating Minimization Algorithms for Transmission Tomography; 2007; IEEE Trans. on Medical Imaging; 26(3)283-297.

Xu, J., et al.; Statistical Projection Completion in X-ray CT Using Consistency Conditions; 2010; IEEE Trans. on Medical Imaging; 29(8)1528-1540.

Yan, C. H., et al.; Reconstruction Algorithm for Polychromatic CT Imaging: Application to Beam Hardening Correction; 2000; IEEE Trans. on Medical Imaging; 19(1)1-11.

* cited by examiner

DUAL-ENERGY TOMOGRAPHIC IMAGING SYSTEM

FIELD OF THE INVENTION

The invention relates to an imaging system, an imaging method and an imaging computer program for imaging an object.

BACKGROUND OF THE INVENTION

The article "Energy-selective Reconstructions in X-ray Computerized Tomography" by Alvarez and Macowski, Phys. Med. Biol, Vol. 21, No. 5, pages 733-744 (1976) discloses that a computed tomography system comprising a radiation source emitting polychromatic radiation and an energy-resolving detector for generating projection data being indicative of the radiation after having traversed the object. The projection data are acquired while the radiation source and the object move relative to each other, in order to acquire projection data in different projection directions. A component decomposition technique is applied to the acquired projection data, in order to determine photoelectric effect attenuation values and Compton effect attenuation values, which are caused by the photoelectric effect and the Compton effect, respectively. The photoelectric effect attenuation values are backprojected for generating a photoelectric effect image of the object and the Compton effect attenuation values are backprojected for generating a Compton image of the object.

The photoelectric effect image and the Compton effect image are corrupted by noise and have therefore a reduced image quality.

SUMMARY OF THE INVENTION

It is an object of the present invention to provide an imaging system, an imaging method and an imaging computer program for imaging an object, wherein the quality of a reconstructed image of the object can be improved.

In a first aspect of the present invention an imaging system for imaging an object is presented, wherein the imaging system comprises:

a projection data providing unit for providing acquired spectral projection data of an object comprising at least two components, a reconstruction unit for iteratively reconstructing at least two final component images of the object by performing several iteration steps, in which at least two intermediate component images are updated based on the acquired spectral projection data and a penalty term, which is indicative of the correlated noise between the at least two intermediate component images.

Since the at least two intermediate component images are updated based on the acquired spectral projection data and a penalty term, which is indicative of the correlated noise between the at least two intermediate component images, correlated noise between the at least two intermediate component images is penalized during the iterative reconstruction. The finally resulting component images of the object are therefore less corrupted by correlated noise and have an improved image quality.

The object can comprise two or more components.

The different components can be different basis materials like bone, soft tissue, metal, a contrast agent like iodine and/or they can relate to different physical effects like a photoelectric effect, a Compton effect, a K-edge effect, et cetera.

The projection data providing unit can be storing unit, in which acquired projection data are stored already, or it can be a projection data acquisition unit like an acquisition unit of an x-ray computed tomography system, and an x-ray C-arm system, a nuclear imaging system, for example, a positron emission tomography system or a single photon emission computed tomography system, et cetera.

Preferentially, the provided acquired spectral projection data correspond to projection data which have been acquired by moving a radiation source emitting polychromatic radiation and the object relative to each other and by spectrally detecting the projection data, which are indicative of the radiation after having traversed the object, while the radiation source and the object move relative to each other.

The correlated noise between the at least two intermediate component images can be positively correlated noise or negatively correlated noise.

It is preferred that the reconstruction unit is adapted to update the at least two intermediate component images by optimizing a sum of a) a likelihood term which depends on a likelihood function defining the likelihood that a forward projection through the intermediate component images leads to simulated spectral projection data which are similar to the acquired spectral projection data and b) the penalty term. The penalty term is a term, which can be optimized by modifying the intermediate component images during the iterative reconstruction such that the correlated noise between the at least two intermediate component images is decreased. It is further preferred that the penalty term depends on an estimation of the covariance of corresponding image elements in different intermediate component images. The estimation of the covariance allows considering the correlated noise by the penalty term in a relatively simple way.

In a preferred embodiment, the reconstruction unit is adapted to a) generate covariance estimation component images, which are reconstructed from the acquired projection data without considering the penalty term, and estimate the covariance from the covariance estimation component images, or b) estimate the covariance from the acquired projection data. In particular, the reconstruction unit can be adapted to generate the covariance estimation component images by applying a component decomposition technique to the acquired projection data for generating line integrals of the components, without considering the penalty term, and by reconstructing the covariance estimation component images from the line integrals of the components. Preferentially, the reconstruction unit is adapted to average image values of the covariance estimation component images and to estimate the covariance of corresponding image elements in different intermediate component images based on the averaged image values. This allows estimating the covariance of corresponding image elements in different intermediate component images with relatively low computational efforts.

It is also preferred that the reconstruction unit is adapted to estimate the covariances of corresponding image elements in different intermediate component images by:

applying a likelihood-based component decomposition on the acquired projection data, wherein a likelihood term which depends on a likelihood function defining the likelihood that a forward projection through an adaptable model of the object leads to simulated spectral projection data which are similar to the acquired spectral projection data is optimized by adapting the model, wherein the model represents a distribution of at least two components, thereby generating line integrals of the components, determining covariances of corresponding line integrals of different components depending on the curvature of the optimized likelihood term, estimating the covariances of corresponding image elements in different intermediate component images by backprojecting the determined covariances of corresponding line integrals of the different components. Preferentially, the likelihood term is the logarithm of the likelihood function, in particular, the negative logarithm of the likelihood function, and the covariances of corresponding line integrals of different components are preferentially determined depending on the curvature of the logarithm of the likelihood function at the location of the optimum. In other words, preferentially the curvature of the logarithm of the likelihood function is evaluated at the likelihood estimate which corresponds to the optimized logarithm of the likelihood function. This allows estimating the covariances with relatively high accuracy. The correlated noise between the intermediate component images can therefore be considered relatively accurately, thereby further increasing the quality of the finally reconstructed final component images.

It is further preferred that the penalty term depends on differences of image elements of a same intermediate component image. In particular, the penalty term depends on differences of neighboring image elements of a same intermediate component image. Thus, local differences of image elements of a same intermediate component image can be considered, wherein larger local differences are preferentially more penalized than smaller local differences, i.e., for example, the penalty term increases with increasing absolute local difference. Since it is assumed that neighboring image elements of a same intermediate component image are more likely to be relatively similar than strongly different, the dependence of the penalty term on local differences can further improve the quality of the component images. Preferentially, the penalty term depends on squares of differences of neighboring image elements of the same intermediate component image and/or on products of differences of neighboring image elements of different component images, i.e. for different component images differences of neighboring image elements of a same component image are calculated and the resulting differences of different component images are multiplied for generating the products on which the penalty term may depend.

It is preferred that the penalty term is also indicative of the noise in each of the intermediate component images itself. Since not only the correlated noise is considered, but also the noise in each of the intermediate component images itself, the quality of the finally reconstructed final component images can be further improved.

In a further aspect of the present invention an imaging method for imaging an object is presented, wherein the imaging method comprises:

providing acquired spectral projection data of an object comprising at least two components, iteratively reconstructing at least two final component images of the object by performing several iteration steps, in which at least two intermediate component images are updated based on the acquired spectral projection data and a penalty term, which is indicative of the correlated noise between the at least two component images.

In a further aspect of the present invention an imaging computer program for imaging an object is presented, wherein the imaging computer program comprises program code means for causing an imaging apparatus as defined by an imaging system for imaging an object, comprising a projection data providing unit for providing acquired spectral projection data of an object comprising at least two components, and a reconstruction unit for iteratively reconstructing at least two final component images of the object by performing several iteration steps, in which at least two intermediate component images are updated based on the acquired spectral projection data and a penalty term, which is indicative of the correlated noise between the at least two intermediate component images to carry out the steps of the imaging method as defined by an imaging method for imaging an object comprising providing acquired spectral projection data of an object comprising at least two components, and iteratively reconstructing at least two final component images of the object by performing several iteration steps, in which at least two intermediate component images are updated based on the acquired spectral projection data and a penalty term, which is indicative of the correlated noise between the at least two component images, when the imaging computer program is run on a computer controlling the imaging apparatus.

It shall be understood that the imaging system for the imaging of the object, the imaging method for imaging the object and the imaging computer program for imaging the object, the imaging computer program comprising program code means for causing an imaging apparatus as defined by the imaging system for imaging the object to carry out the steps of the imaging method for imaging the object, when the imaging computer program is run on a computer controlling the imaging apparatus have similar and/or identical preferred embodiments as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
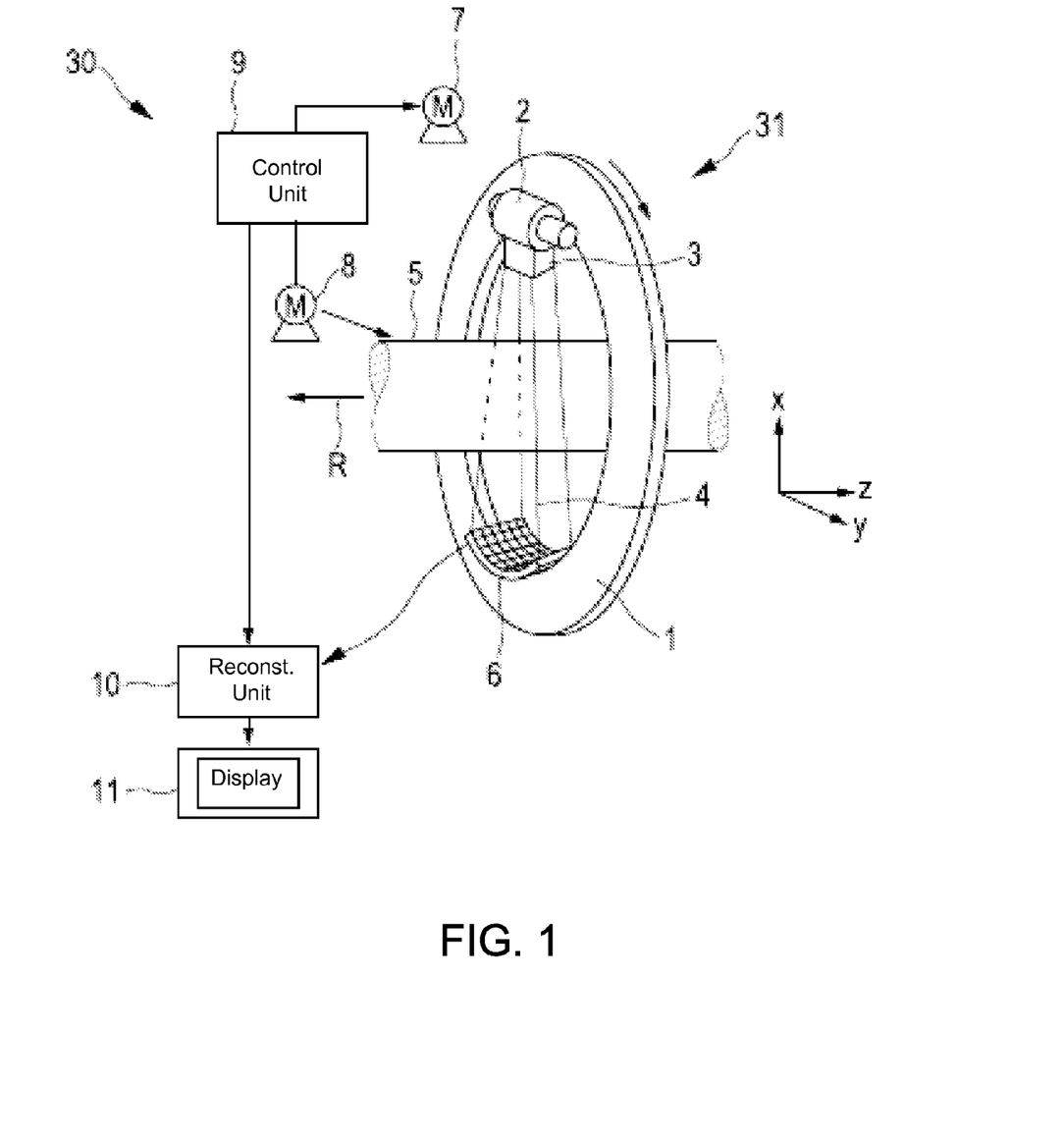
FIG. 1 shows schematically and exemplarily an imaging system for imaging an object.

FIG. 1 shows schematically and exemplarily an imaging system for imaging an object being a computed tomography system 30. The computed tomography system 30 includes a gantry 1 which is capable of rotation about a rotational axis R which extends parallel to the z direction. A radiation source 2, which is, in this embodiment, an x-ray tube, is mounted on the gantry 1. The radiation source 2 is provided with a collimator 3, which forms, in this embodiment, a conical radiation beam 4 from the radiation generated by the radiation source 2. The radiation traverses an examination zone 5 comprising an object, for example, a person, an animal or a technical object, wherein the examination zone 5 is, in this embodiment, cylindrical. The object comprises at least two components, for instance, soft tissue and bone. After having traversed the examination zone 5 the radiation beam 4 is incident on a detection device 6, which comprises a two-dimensional detection surface. The detection device 6 is mounted on the gantry 1.

The computed tomography system 30 comprises two motors 7, 8. The gantry 1 is driven at a preferably constant but adjustable angular speed by the motor 7. The motor 8 is provided for displacing the object, for example, a person, who is arranged on a patient table in the examination zone 5, parallel to the direction of the rotational axis R or the z axis. These motors 7, 8 are controlled by a control unit 9, for instance, such that the radiation source 2 and the object move relatively to each other along a helical trajectory. However, it is also possible that the relative movement is performed along another trajectory. For instance, it is also possible that the object is not moved, but that only the radiation source 2 is rotated, i.e. that the radiation source moves along a circular trajectory relative to the object. Furthermore, in another embodiment, the collimator 3 can be adapted for forming another beam shape, in particular a fan beam, and the detection device 6 can comprise a detection surface, which is shaped corresponding to the other beam shape, in particular to the fan beam.

The radiation source 2 is adapted to emit polychromatic radiation and the detection device 6 is an energy-resolving detection device for acquiring spectral protection data.

An energy resolving detection device works, for example, on the principle of counting the incident photons and outputting a signal that shows the number of photons per energy in a certain energy bin. Such an energy-resolving detection device is described in, for instance, the articles "First test measurements of a 64k pixel readout chip wordkin in a single photon counting mode" by Llopart, X. et al., Nuclear Instruments and Methods in Physics Research, Section A, Volume 509, Issue 1-3, pages 157-163 (2003), and "Medipix2: A 64-k pixel readout chip with 55 mum square elements working in a single photon counting mode" by Llopart, X. et al., IEEE Transactions on Nuclear Science, Volume 49, Issue 5, pages 2279-2283 (2000), which are herewith incorporated by reference.

During a relative movement of the radiation source 2 and the object the detection device 6 generates projection data depending on the radiation incident on the detection surface of the detection device 6. Therefore, the radiation source 2, the elements for moving the radiation source 2 relative to the object, in particular, the motors 7, 8 and the gantry 1, and the detection device 6 form a detection values providing unit 31 for providing projection data of the region of interest.

The acquired projection data are provided to a reconstruction unit 10 for iteratively reconstructing at least two final component images of the object, which are then shown on a display 11.

The reconstruction unit 10 is adapted to iteratively reconstruct at least two final component images of the object by performing several iteration steps, in which at least two intermediate component images are updated based on the acquired spectral projection data and a penalty term, which is indicative of the correlated noise between the at least two intermediate component images. In particular, the reconstruction unit 10 is adapted to update the at least two intermediate component images by minimizing a sum $\Psi$ of a) a likelihood term $-\log(L)$ which depends on a likelihood function L defining the likelihood that a forward projection through the intermediate component images leads to simulated spectral projection data which are similar to the acquired spectral projection data and b) the penalty term P, i.e. the reconstruction unit 10 is adapted to minimize following equation:

$$\Psi = -\log(L) + P \qquad (1)$$

The negative log-likelihood $-\log(L)$ can, for example, be defined by the following equation, in which a noise model is given by the Poisson distribution:

$$-\log(L(a_j^i)) = \sum_{m=1}^{N_S} \sum_{r=1}^{N_R} \overline{\lambda}_{mr}(a_j^i) - \lambda_{mr} \log(\overline{\lambda}_{mr}(a_j^i)), \qquad (2)$$

wherein $a_j^i$ denotes the image element indicated by the index i in the component image indicated by the index j, $N_S$ denotes the number of independent spectral measurements per geometrical ray, for example, the number of energy bins in the case of photon counting, the index m indicates the respective independent spectral measurement, for example, the respective energy bin, $N_R$ denotes the total number of geometrical rays acquired during the respective acquisition of the projection data, the index r indicates the respective geometrical ray, $\lambda_{mr}$ denotes a detection value of the spectral measurement, for example, of the energy bin indicated by m and of the geometrical ray indicated by r, and $\overline{\lambda}_{mr}$ denotes the expectation value of the detection value $\lambda_{mr}$. In this embodiment, the dependence of $\overline{\lambda}_{mr}$ on the component images can be explicitly written as:

$$\overline{\lambda}_{mr}(a_j^i) = \int dE \varphi(E) \delta_m(E) \exp\left(-\sum_{j'=1}^{N_B} f_{j'}(E) A_{j'}^r\right) = \qquad (3)$$

$$= \int dE \varphi(E) \delta_m(E) \exp\left(-\sum_{j'=1}^{N_B} f_{j'}(E) \sum_{i=1}^{N_V} g_i^r a_{j'}^i\right),$$

where in the second line of equation (3) the forward projection of the component images $a_j^i$ is included using image element weights $g_i^r$ corresponding to the geometrical contribution of the image element indicated by i to the line integral of the geometrical ray indicated by r. Moreover, $\phi(E)$ denotes the spectrum of radiation immediately before traversing the object to be imaged, $\phi_m(E)$ denotes the spectral sensitivity of the m-th energy bin, $A_{j'}^r$ denotes the line integral of absorption values through the j'-th intermediate component image along the radiation line indicated by r and $f_{j'}(E)$ denotes the energy-dependent absorption of the component indicated by j'.

The penalty term P depends on an estimation of the covariance $\text{Cov}(a_j^i, a_{j'}^i)$ of corresponding image elements $a_j^i, a_{j'}^i$ in different intermediate component images indicated by the indices j and j'. The penalty term P further depends on differences of image elements of a same intermediate component image. In this embodiment, the penalty term P is defined by following equation:

$$P = \alpha \sum_{j'=1}^{N_B} \sum_{j=1}^{N_B} \sum_{i=1}^{N_V} \sum_{k \in N_i} w_{ik} (a_j^i - a_j^k) \text{Cov}(a_j^i, a_{j'}^i)(a_{j'}^i - a_{j'}^k), \qquad (4)$$

wherein $\alpha$ is a positive constant, $N_B$ denotes the number of components, for example, $N_B$ may be 2, if the object comprises bone and soft tissue, the sum over i is a sum over all $N_v$ image elements of the intermediate component images, the sum over k is the sum over image elements in the neighborhood of the respective actual image element with the index i, wherein the image elements in the neighborhood are denoted by $N_i$, and $w_{ik}$ is a geometrical weight that compensates for different distances between the respective image element with the index i and an image element in the neighborhood with the index k. The geometrical weight $w_{ik}$ preferentially decreases with increasing distance, for example, the geometrical weight $w_{ik}$ can be the inverse distance. The positive constant α can be chosen such that a desired consideration of the penalty term P relative to the negative algorithm of the likelihood L is obtained. An optimized positive constant α can be obtained by, for example, calibration reconstructions, wherein the component images are reconstructed for different constants α and a certain α is chosen, which leads to reconstructed component images comprising an optimized noise reduction.

If in equation (4) j is identical to j', the covariance reduces to the variance of the noise in the respective image element of the respective component image. The variance is indicative of the noise in each of the intermediate component images itself, i.e. the penalty term P is not only indicative of the correlated noise between different intermediate component images, but also indicative of the noise in each of the intermediate component images itself.

For estimating the covariances the reconstruction unit 10 is adapted to generate covariance estimation component images, which are reconstructed from the acquired projection data without considering the penalty term, and to estimate the covariance from the covariance estimation component images. The covariance estimation component images are generated by applying a component decomposition technique to the acquired projection data for generating line integrals of the components, without considering the penalty term, and by reconstructing the covariance estimation component images from the line integrals of the components. The component decomposition technique can be applied to the acquired projection data by solving a system of equations for a plurality of energy-dependent detection values being the acquired spectral projection data, using a model of the detection values describing a detection value as a combination of contributions, which depend on energy-dependent attenuations of the respective component. In particular, the reconstruction unit 10 can be adapted to solve following system of equations:

$$\lambda_{mr} = \int dE \phi(E) \delta_m(E) \exp(-\Sigma_{j=1}^{NB} A_j^r f_j(E)), \quad (5)$$

wherein $A_j^r$ denotes the line integral of absorption values through the covariance estimation component image indicated by j along the geometrical ray or radiation line indicated by r.

If the number of energy bins is at least equal to the number of components, the system of equations can be solved with known numerical methods, wherein the quantities φ(E), $\delta_m(E)$ and $f_j(E)$ are known and the result of solving the system of equations are the line integrals $A_j^r$. The spectrum of radiation (p (E) and the spectral sensitivity $\delta_m(E)$ are characteristics of the imaging system and are known from, for example, corresponding measurements. The spectral absorption $f_j(E)$ of the components, for example, the spectral absorption of bone and soft tissue, is also known from measurements and/or from literature. The covariance estimation component images can then be reconstructed by, for example, performing a filtered backprojection or another reconstruction algorithm on the determined line integrals $A_j^r$.

For estimating the covariance from the covariance estimation component images the reconstruction unit 10 is preferentially adapted to average image values of the covariance estimation component images and to estimate the covariance of corresponding image elements in different intermediate component images based on the averaged image values. For example, an averaging filter can be applied to each of the covariance estimation component images, which determines for each of the image elements of the respective covariance estimation component images an average of the respective image element and neighboring image elements. The covariance between two component images can then be estimated in accordance with following equation:

$$\text{Cov}(a_j^i, a_{j'}^i) = E(b_j^i b_{j'}^i) - E(b_j^i) E(b_{j'}^i), \quad (6)$$

wherein E(x) denotes the average of x, $b_j^i$ denotes the i-th image value of the covariance estimation component image of the component indicated by j, and $b_{j'}^i$ denotes the i-th image element of the covariance estimation component image of the component indicated by j'.

In another embodiment, the reconstruction unit can also be adapted to estimate the covariance from the acquired projection data. In particular, the reconstruction unit can be adapted to estimate the covariances of corresponding image elements in different intermediate component images by applying a likelihood-based component decomposition on the acquired projection data, wherein a likelihood term which depends on a likelihood function defining the likelihood that a forward projection through an adaptable model of the object leads to simulated spectral projection data which are similar to the acquired spectral projection data is optimized by adapting the model, wherein the model represents a distribution of the different components of the object, thereby generating line integrals $A_j^r$ of the components indicated by j. In this embodiment, the likelihood term is a negative logarithm of the likelihood function, which can be defined by the following equation:

$$-\log(L(A_j^r)) = \sum_{m=1}^{N_S} \overline{\lambda}_{mr}(A_j^r) - \lambda_{mr} \log(\overline{\lambda}_{mr}(A_j^r)), \quad (7)$$

wherein by minimizing the negative logarithm an optimized likelihood estimate for the most likely component composition $\hat{A}_j^r$, can be obtained. For example, the line integrals $A_j^r$ can be varied, for instance, by using a simplex algorithm such that equation (7) is minimized.

Then, the reconstruction unit can determine covariances of corresponding line integrals of different components depending on the curvature of the optimized likelihood term, in particular, in accordance with following equation:

$$\text{Cov}(A_j^r, A_{j'}^r)^{-1} \cong -\left.\frac{\partial^2 \log(L)}{\partial A_j^r \partial A_{j'}^r}\right|_{A_j^r = \hat{A}_j^r}. \quad (8)$$

In words, the proposed estimate of the covariance of the line integrals $A_j^r$ on projection data can be given by the inverse of the matrix formed by the components of the second derivatives of the negative log-likelihood with respect to $A_j^r$ evaluated at the maximum of the log-likelihood function $\hat{A}_j^r$.

The reconstruction unit can further be adapted to estimate the covariances of corresponding image elements in different intermediate component images by backprojecting the determined covariances of corresponding line integrals of the different components.

After the covariances have been estimated, the reconstruction unit 10 minimizes equation (1) by iteratively reconstructing the component images.

In this embodiment, the reconstruction unit 10 is adapted to iteratively update the component images based on a coordinate descent method, in particular, based on the Newton-Raphson method, wherein a local gradient and a local curvature determine an update step in accordance with following equation:

$$a_j^{i(n+1)} = \left[ a_j^{i(n)} + \frac{\frac{\partial \Psi}{\partial a_j^i}\Big|_{a_j^i = a_j^{i(n)}}}{\frac{\partial^2 \Psi}{\partial a_j^i \partial a_j^i}\Big|_{a_j^i = a_j^{i(n)}}} \right]_+ =$$

$$= \left[ a_j^{i(n)} + \frac{\frac{1}{2\alpha} \sum_{m=1}^{N_S} \sum_{r=1}^{N_R} \left[ \left(1 - \frac{\lambda_{mr}}{\overline{\lambda}_{mr}}\right) \frac{\partial \overline{\lambda}_{mr}}{\partial a_j^i} \right] + \sum_{j'=1}^{N_B} \sum_{k \in N_i} [w_{ik}(\text{Cov}(a_j^i, a_{j'}^i) + \text{Cov}(a_j^k, a_{j'}^k))(a_{j'}^i - a_{j'}^k)]}{\frac{1}{2\alpha} \sum_{m=1}^{N_S} \sum_{r=1}^{N_R} \left[ \frac{\lambda_{mr}}{\overline{\lambda}_{mr}^2} \left(\frac{\partial \overline{\lambda}_{mr}}{\partial a_j^i}\right)^2 + \left(1 - \frac{\lambda_{mr}}{\overline{\lambda}_{mr}}\right) \frac{\partial^2 \overline{\lambda}_{mr}}{\partial a_j^i \partial a_j^i} \right] + \sum_{k \in N_i} w_{ik}(\text{Var}(a_j^i) + \text{Var}(a_j^k))} \right]_+ . \quad (9)$$

In equation (9), the "+" indicates the possibility to enforce a non-negativity constraint on the image data. The symbol $\delta^{ik}$ is equal to 1 for i=k and 0 otherwise. It is eqmphazised that the covariance and variances appearing in the above expressions are preferentially not updated and can be considered constants during the iteration, although they depend on the location in the images.

Figure 2:
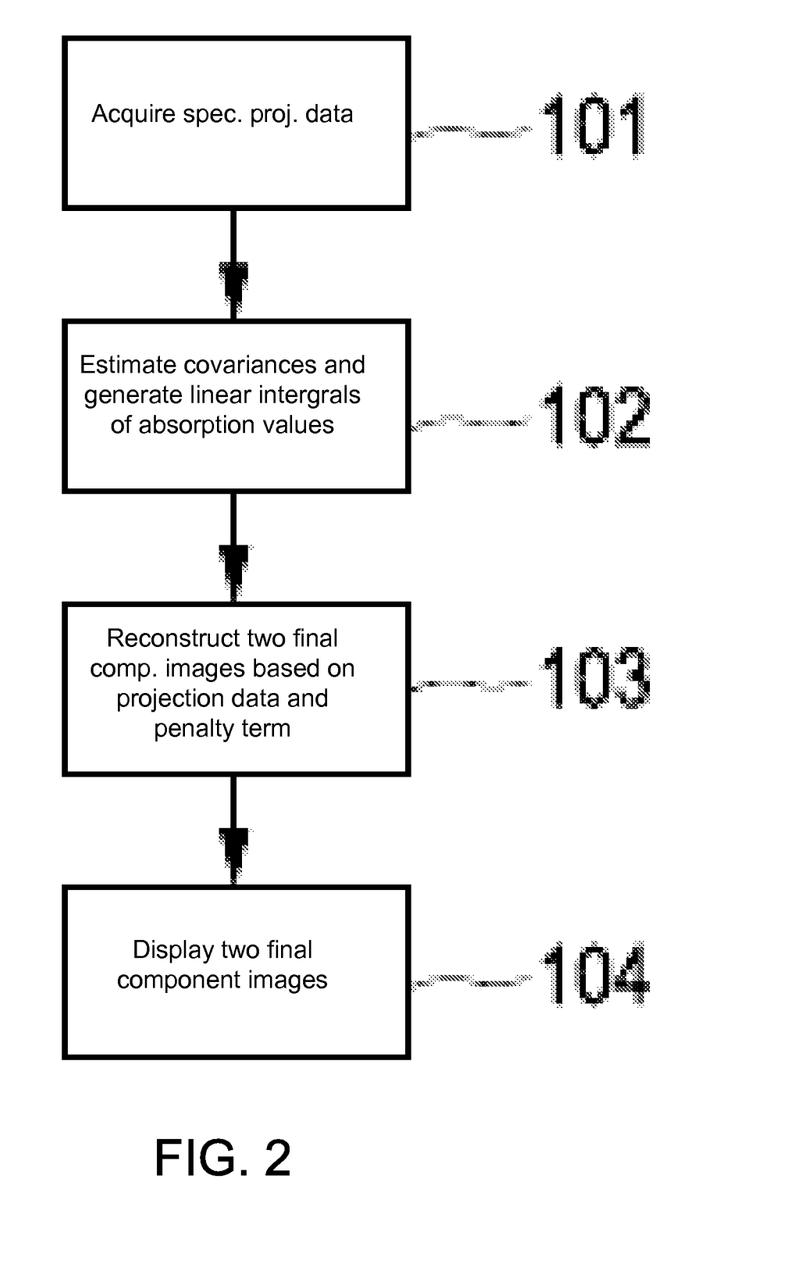
FIG. 2 shows a flowchart exemplary illustrating an embodiment of an imaging method for imaging an object.

In the following an embodiment of an imaging method for imaging an object will exemplarily be described with reference to a flowchart shown in FIG. 2.

In step 101, acquired spectral projection data of an object comprising at least two components are provided. The acquired spectral projection data can be stored in a storage unit and retrieved from the storage unit for providing the same. However, in step 101 also the actual acquisition can be performed, wherein, for example, a radiation source emitting polychromatic radiation and the object are moved relative to each other and projection data, which are indicative of the radiation after having traversed the object, are spectrally detected, while the radiation source and the object move relative to each other. In step 102, covariances of corresponding image elements in different intermediate component images are estimated as described above, wherein while estimating the covariances also linear integrals of absorption values of the components are generated. In step 103, at least two final component images of the object are reconstructed by performing several iteration steps, wherein in an iteration step at least two intermediate component images are updated based on the acquired spectral projection data and a penalty term, which is indicative of the correlated noise. In this embodiment, the penalty term comprises covariances between the at least two intermediate component images, in order to be indicative of the correlated noise. In particular, the acquired spectral projection data are indirectly used by applying the iterative reconstruction algorithm to the linear integrals of the different components determined from the acquired projection data. The iterative reconstruction is performed such that above equation (1) is minimized. The resulting at least two final component images are shown on the display 11 in step 104.

Non-spectral, iterative reconstruction techniques for computed tomography imaging, for example, techniques based on the likelihood of the measured data, can make use of some kind of regularization that enforces a certain amount of smoothness in the images while preserving the sharpness of edge structures. The regularization can be some local operator in the image domain that penalizes large image value differences between nearest neighbors. In spectral computed tomography imaging the attenuation can be decomposed in one way or another into the attenuation caused by certain components like certain basis materials, for example, bones, soft tissue and/or contrast material. If combined with the iterative reconstruction, the possibilities of regularization increase in the sense that penalties in the image domain can involve not only the noise variances in the various component images, but also the quite disturbing anti-correlation between the different component images. The imaging system and imaging method described above can be used to reduce anti-correlated noise in component images by adding a penalty term to a likelihood term, which depends on a likelihood function, wherein the penalty term is indicative of positively and/or negatively, i.e. anti-correlated, noise between different component images and indicative of noise in each of the different component images itself.

Generally, spectrally decomposed component images like material basis images can be quite noisy, because of the very similar spectral attenuation properties of the different components, in particular, of the different basis materials, especially in biological tissue. The usefulness of the spectral decompositions in clinical practice can therefore be severely compromised by this fact. The imaging system and method described above can be used to reduce the noise, in particular, compared to analytically reconstructed images using, for instance, a filtered backprojection reconstruction of component decompositions obtained in the projection domain.

The imaging system and imaging method preferentially penalize positively correlated noise and/or negatively correlated noise, i.e. anti-correlated noise, in the component images during the iterations in addition to penalizing noise itself in the component images. This can be done by using spatially-resolved estimates of noise variances and noise covariances for the different component images during the iterations. These estimates can be obtained by, in a first step, generating a likelihood estimate for all measurements independently of one another, together with an estimate for the variances and covariances on the acquired projection data. In a second step the analytic formalism of filtered backprojection can be used to obtain the spatially-resolved estimates of the noise variances and noise covariances for the component images.

Although in the above described embodiments the imaging system is a computed tomography system, the imaging system can also be another imaging system, which uses projection data for iteratively reconstructing an image of an object. For example, the imaging system can be an x-ray C-arm imaging system or a nuclear imaging system like a single photon emission computed tomography system or a positron emission tomography system.

Although in the above described embodiments the different components are, for example, different basis materials like bone and soft issue, the different components can also relate to different physical effects like a photoelectric effect, a Compton effect, a K-edge effect, et cetera.

Although in the above described embodiments the detection device is an energy-resolving detection device, in other embodiments also a non-energy-resolving detection device can be used, wherein the same non-energy-resolving detection device is alternately illuminated by radiation having different energy spectra or wherein different non-energy-resolving detection devices are illuminated by different radiation having different energy spectra. For example, a dual-energy technique or combinations of dual-energy techniques like a quad-energy technique can be used, in particular, if the imaging system is a computed tomography system.

Although in the above described embodiments certain measures for optimizing the likelihood terms, in particular, for optimizing equations (2) and (9), have been described, also other measures for optimizing the likelihood terms can be used like the Transmission Expectation Maximization algorithm (EM), the Separable Paraboidal Surrogates algorithm (SPS) or Weighted Least-Squares Methods (LS).

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Calculations like the estimation of the covariances or the reconstructions performed by one or several units or devices can be performed by any other number of units or devices. For example, steps 102 and 103 can be performed by a single unit or by any other number of different units. The calculations and/or the control of the imaging system in accordance with the imaging method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to an imaging system for imaging an object. A projection data providing unit provides acquired spectral projection data of an object comprising at least two components, and a reconstruction unit iteratively reconstructs at least two final component images of the object by performing several iteration steps, in which at least two intermediate component images are updated based on the acquired spectral projection data and a penalty term, which is indicative of the correlated noise between the at least two intermediate component images. Since the at least two intermediate component images are updated based on the acquired spectral projection data and a penalty term, which is indicative of the correlated noise, correlated noise is penalized during the iterative reconstruction. The finally resulting component images of the object are therefore less corrupted by correlated noise and have an improved image quality.

The invention claimed is:

1. An imaging system for imaging an object, the imaging system comprising:

a projection data providing unit which includes a computer configured for providing acquired spectral projection data of an object comprising at least two components, a reconstruction unit which includes a computer configured for iteratively reconstructing at least two final component images of the object by performing several iteration steps, in which at least two intermediate component images reconstructed from the acquired spectral projection data are updated based on the acquired spectral projection data and a penalty term, which is indicative of a correlated noise between the at least two intermediate component images.

2. The imaging system as defined in claim 1, wherein the reconstruction unit is adapted to update the at least two intermediate component images by optimizing a sum of a) a likelihood term which depends on a likelihood function defining a likelihood that a forward projection through the intermediate component images leads to simulated spectral projection data which are similar to the acquired spectral projection data and b) the penalty term.

3. The imaging system as defined in claim 1, wherein the penalty term depends on an estimation of a covariance of corresponding image elements in different intermediate component images.

4. The imaging system as defined in claim 3, wherein the reconstruction unit is adapted to a) generate covariance estimation component images, which are reconstructed from the acquired projection data without considering the penalty term, and estimate the covariance from covariance estimation component images, or b) estimate the covariance from the acquired projection data.

5. The imaging system as defined in claim 4, wherein the reconstruction unit is adapted to generate the covariance estimation component images by applying a component decomposition technique to the acquired projection data for generating line integrals of the components, without considering the penalty term, and by reconstructing the covariance estimation component images from the line integrals of the components.

6. The imaging system as defined in claim 4, wherein the reconstruction unit is adapted to average image values of the covariance estimation component images and to estimate the covariance of corresponding image elements in different intermediate component images based on the averaged image values.

7. The imaging system as defined in claim 4, wherein the reconstruction unit is adapted to estimate the covariances of corresponding image elements in different intermediate component images by:

applying a likelihood-based component decomposition on the acquired projection data, wherein a likelihood term which depends on a likelihood function defining a likelihood that a forward projection through an adaptable model of the object leads to simulated spectral projection data which are similar to the acquired spectral projection data is optimized by adapting the model, wherein the model represents a distribution of at least two components, thereby generating line integrals of the components, determining covariances of corresponding line integrals of different components depending on a curvature of the optimized likelihood term, estimating the covariances of corresponding image elements in different intermediate component images by backprojecting the determined covariances of corresponding line integrals of the different components.

8. The imaging system as defined in claim 1, wherein the penalty term depends on differences of image elements of a same intermediate component image.

9. The imaging system as defined in claim 1, wherein the penalty term is also indicative of the noise in each of the intermediate component images itself.

10. The imaging system as defined in claim 1, wherein the provided acquired spectral projection data correspond to projection data which have been acquired by moving a radiation source emitting polychromatic radiation and the object relative to each other and by spectrally detecting the projection data, which are indicative of the radiation after having traversed the object, while the radiation source and the object move relative to each other.

11. An imaging method for imaging an object, the imaging method comprising:
    providing acquired spectral projection data of an object comprising at least two components,
    iteratively reconstructing at least two final component images of the object by performing several iteration steps, in which at least two intermediate component images reconstructed from the acquired spectral projection data are updated based on the acquired spectral projection data and a penalty term, which is indicative of a correlated noise between the at least two component images.

12. An imaging computer program for imaging an object, the imaging computer program comprising program code stored in a non-transitory computer readable storage medium which cause an imaging apparatus to carry out the steps of the imaging method as defined in claim 11, when the imaging computer program is run on a computer controlling the imaging apparatus.

13. An imaging system for imaging an object, comprising:
    a projection data providing unit which includes a computer configured for acquiring spectral projection data of an object comprising at least two components;
    a reconstruction unit which includes a computer configured for iteratively reconstructing at least two final component images of the object by an iterative update of at least two intermediate component images reconstructed from the acquired spectral projection data based on the acquired spectral projection data and a penalty term, which is indicative of the a correlated noise between the at least two intermediate component images, and the penalty term depends on an estimation of a covariance of corresponding image elements in different intermediate component images.

14. The imaging system as defined in claim 13, wherein the reconstruction unit is adapted to generate covariance estimation component images, which are reconstructed from the acquired projection data without considering the penalty term, and estimate the covariance from the covariance estimation component images.

15. The imaging system as defined in claim 14, wherein the reconstruction unit is adapted to generate the covariance estimation component images by applying a component decomposition technique to the acquired projection data for generating line integrals of the components, without considering the penalty term, and by reconstructing the covariance estimation component images from the line integrals of the components.

16. The imaging system as defined in claim 14, wherein the reconstruction unit is adapted to average image values of the covariance estimation component images and to estimate the covariance of corresponding image elements in different intermediate component images based on the averaged image values.

17. The imaging system as defined in claim 14, wherein the reconstruction unit is adapted to estimate the covariances of corresponding image elements in different intermediate component images by:
    applying a likelihood-based component decomposition on the acquired projection data, wherein a likelihood term which depends on a likelihood function defining a likelihood that a forward projection through an adaptable model of the object leads to simulated spectral projection data which are similar to the acquired spectral projection data is optimized by adapting the model, wherein the model represents a distribution of at least two components, thereby generating line integrals of the components,
    determining covariances of corresponding line integrals of different components depending on a curvature of the optimized likelihood term,
    estimating the covariances of corresponding image elements in different intermediate component images by backprojecting the determined covariances of corresponding line integrals of the different components.

18. The imaging system as defined in claim 13, wherein the projection data providing unit comprises at least one of an acquisition unit of an x-ray computed tomography system, an x-ray C-arm system, a positron emission tomography system, or a single photon emission computed tomography system.

* * * * *